US011377048B2

(12) United States Patent
Tomosada (10) Patent No.: US 11,377,048 B2
(45) Date of Patent: Jul. 5, 2022

(54) BODY SIDE UNIT AND WIRE HARNESS WIRING STRUCTURE (71) Applicant: YAZAKI CORPORATION, Tokyo (JP)

(72) Inventor: Kosuke Tomosada, Susono (JP)

(73) Assignee: YAZAKI CORPORATION, Tokyo (JP)

(*) Notice: Subject to any disclaimer, the term of this patent is extended or adjusted under 35 U.S.C. 154(b) by 0 days.

(21) Appl. No.: 17/185,711

(22) Filed: Feb. 25, 2021

(65) Prior Publication Data
US 2021/0276499 A1 Sep. 9, 2021

(30) Foreign Application Priority Data
Mar. 3, 2020 (JP) .............................. JP2020-035979

(51) Int. Cl.
B60R 16/02 (2006.01)
B60R 16/03 (2006.01)

(52) U.S. Cl.
CPC .......... B60R 16/0215 (2013.01); B60R 16/03 (2013.01)

(58) Field of Classification Search
None
See application file for complete search history.

(56) References Cited

U.S. PATENT DOCUMENTS

| 6,668,865 | B2* | 12/2003 | Miyamoto | B60R 16/0215 138/108 |
| 10,800,540 | B2* | 10/2020 | Gilbertson | F16L 3/222 |
| 2002/0000499 | A1* | 1/2002 | Aoki | B60R 16/0215 248/51 |
| 2003/0183413 | A1* | 10/2003 | Kato | B60R 16/0215 174/135 |
| 2003/0222183 | A1* | 12/2003 | Kato | B60R 16/0215 248/49 |
| 2006/0052054 | A1* | 3/2006 | Uehara | B60J 5/06 455/41.1 |
| 2007/0084619 | A1 | 4/2007 | Kisu et al. | |
| 2016/0252330 | A1* | 9/2016 | Babbitt | F41G 11/003 248/315 |
| 2019/0077343 | A1 | 3/2019 | Kogure et al. | |
| 2020/0055690 | A1* | 2/2020 | Hamada | H02G 11/02 |
| 2020/0099214 | A1* | 3/2020 | Sano | H01B 7/08 |
| 2021/0061195 | A1* | 3/2021 | Kogure | B62D 65/024 |

FOREIGN PATENT DOCUMENTS

| EP | 1312511 | A1 * | 5/2003 | ......... B60R 16/0215 |
| EP | 1605568 | A1 * | 12/2005 | ......... B60R 16/0215 |
| EP | 1936767 | A1 * | 6/2008 | ......... B60R 16/0215 |
| EP | 3875319 | A1 * | 9/2021 | ......... B60R 16/0215 |

(Continued)

Primary Examiner — Timothy J. Dole
Assistant Examiner — Muhammed Azam
(74) Attorney, Agent, or Firm — Kenealy Vaidya LLP (57) ABSTRACT A body side unit is configured to attach a wire harness wired between a vehicle body and a slide door to the vehicle body. In the body side unit, a rotary inner is attached to the wire harness. A protector supports the rotary inner rotatably and movably in an up-down direction, and is fixed to the vehicle body. A coil spring is provided between the rotary inner and the protector, and biases the rotary inner such that the rotary inner faces downward in the up-down direction.

5 Claims, 8 Drawing Sheets (56) References Cited

FOREIGN PATENT DOCUMENTS

| JP | 2003341446 A | * | 12/2003 | |
|---|---|---|---|---|
| JP | 2017-206051 A | | 11/2017 | |
| JP | 2017206051 A | * | 11/2017 | ................ B60J 5/06 |
| JP | 2017-222306 A | | 12/2017 | |
| JP | 6430996 B2 | * | 11/2018 | ................ B60J 5/06 |
| JP | 2021030905 A | * | 3/2021 | ......... B60R 16/0215 |
| JP | 2021129413 A | * | 9/2021 | |
| WO | WO-2004082090 A1 | * | 9/2004 | ......... B60R 16/0215 |
| WO | WO-2007043225 A1 | * | 4/2007 | ......... B60R 16/0215 |
| WO | WO-2014115674 A1 | * | 7/2014 | ......... B60R 16/0215 |
| WO | WO-2015033889 A1 | * | 3/2015 | ............. B60J 5/047 |
| WO | WO-2015053216 A1 | * | 4/2015 | ........... B60R 16/027 |
| WO | WO-2015053217 A1 | * | 4/2015 | ......... B60R 16/0215 |
| WO | WO-2015080024 A1 | * | 6/2015 | ......... B60R 16/0215 |
| WO | WO-2017199685 A1 | * | 11/2017 | ................ B60J 5/06 |

* cited by examiner

FIG.8A
FULLY OPEN STATE

FIG.8B
HALF-OPEN STATE

BODY SIDE UNIT AND WIRE HARNESS WIRING STRUCTURE

CROSS-REFERENCE TO RELATED APPLICATIONS

This application is based on and claims priority under 35 USC 119 from Japanese Patent Application No. 2020-035979 filed on Mar. 3, 2020, the contents of which are incorporated herein by reference.

TECHNICAL FIELD

The present invention relates to a body side unit and a wiring structure of a wire harness.

BACKGROUND ART

A power supply device disclosed in Patent Literatures 1 and 2 includes a body side unit configured to attach a wire harness to a vehicle body, and a door side unit configured to attach the wire harness to a slide door. The door side unit is disposed between an inner panel and a door trim of the slide door, and the wire harness is attached to the body side unit through a lower end of the door trim.

A distance between the body side unit and the door side unit is longest when the slide door is in a fully closed state or a fully open state, and the wire harness is stretched. In addition, the distance between the body side unit and the door side unit is shortest when the slide door is in a half-open state, and a central portion of the wire harness drips downward in an up-down direction.

In the half-open state, when the distance between the body side unit and the door side unit described above is short, a bending R of the central portion of the wire harness becomes small, and a force with which the wire harness pushes up the body side unit upward becomes strong. Therefore, there is a problem that the body side unit and the wire harness strongly interfere with each other and abnormal sound is generated. Therefore, there arises a problem that, when an attachment position of the door side unit is raised in order to increase the bending R, the wire harness and the lower end of the door trim interfere with each other in the fully closed state and the fully open state.

CITATION LIST

Patent Literature

Patent Literature 1: JP-A-2017-206051
Patent Literature 2: JP-A-2017-222306

SUMMARY OF INVENTION

The present invention has been made in view of the above circumstances, and an object of the present invention is to provide a body side unit and a wiring structure of a wire harness capable of preventing interference of a wire harness.

A body side unit according to the present invention is a body side unit configured to attach a wire harness wired between a vehicle body and a slide door to the vehicle body.

The body side unit includes:
a body side attachment portion to be attached to the wire harness;
a body side fixing portion supporting the body side attachment portion rotatably and movably in an up-down direction and fixed to the vehicle body; and
a biasing member provided between the body side attachment portion and the body side fixing portion and configured to bias the body side attachment portion such that the body side attachment portion faces downward in the up-down direction.

A wiring structure of a wire harness according to the present invention includes:
a wire harness;
a body side unit configured to attach the wire harness to a vehicle body; and a door side unit configured to attach the wire harness to a slide door, in which
the body side unit includes:
a body side attachment portion to be attached to the wire harness;
a body side fixing portion rotatably supporting the body side attachment portion and fixed to the vehicle body; and
a biasing member provided between the body side attachment portion and the body side fixing portion and configured to bias the body side attachment portion such that the body side attachment portion faces downward in an up-down direction.

The present invention has been briefly described above. Details of the present invention are further clarified by reading a mode for carrying out the invention (hereinafter, referred to as "embodiment") described below with reference to attached drawings.

DESCRIPTION OF EMBODIMENTS

A specific embodiment according to the present invention will be described below with reference to the drawings.

Figure 1:
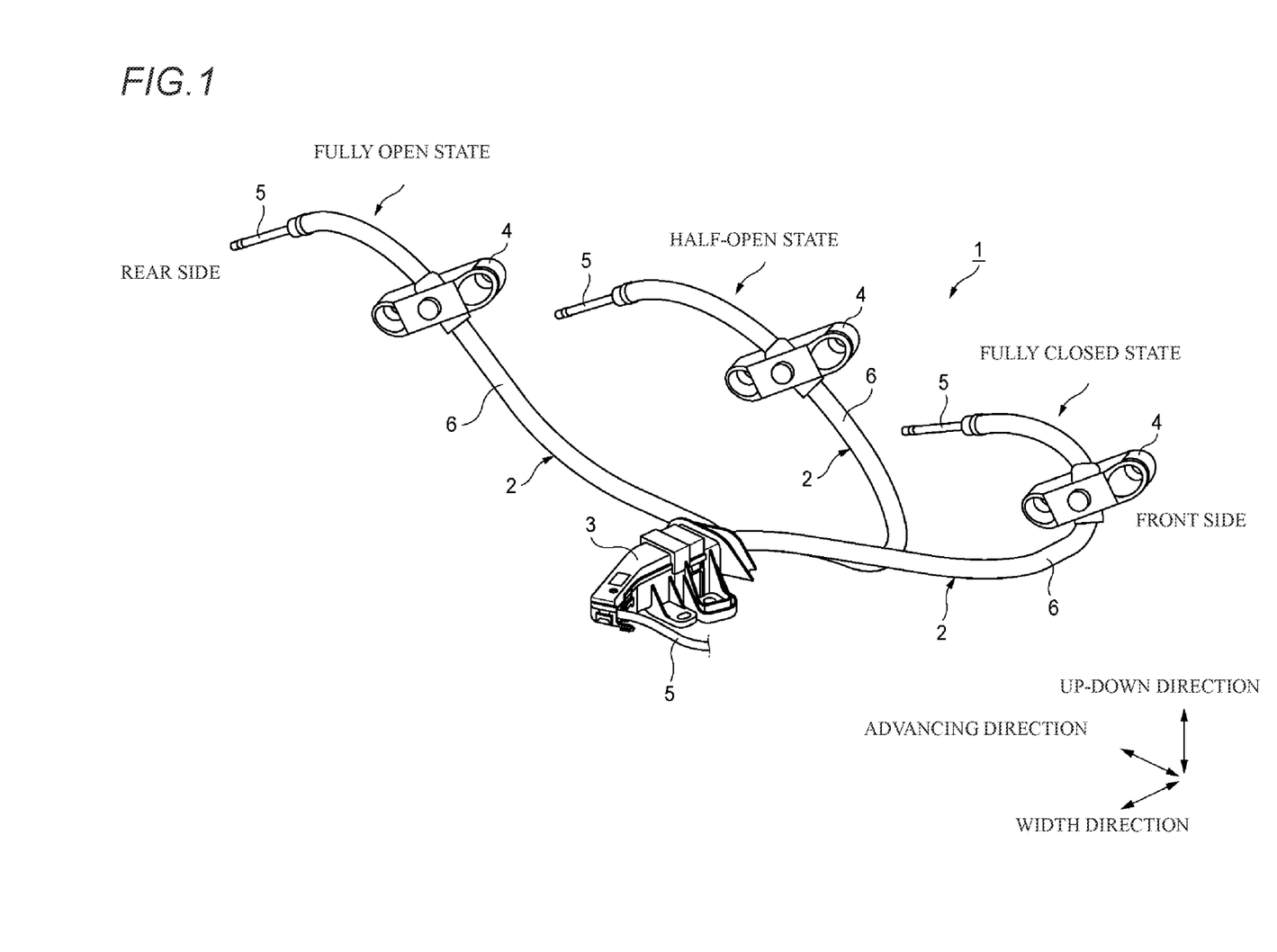
FIG. 1 is a perspective view showing an embodiment of a wiring structure of a corrugated tube according to the present invention.

A wiring structure of a wire harness 1 according to the present embodiment is for wiring a wire harness 2 between a vehicle body and a slide door 10 (FIG. 2) slidably attached to the vehicle body. As shown in FIG. 1, the wiring structure 1 includes the wire harness 2, a body side unit 3, and a door side unit 4. FIG. 1 shows a state of the wire harness 2 in which the slide door 10 is in each of a fully closed state, a half-open state, and a fully open state.

The wire harness 2 is provided from the vehicle body to the slide door 10, and includes a plurality of electric wires 5 and a corrugated tube 6 covering an outer periphery of the electric wires 5.

The electric wire 5 is electrically connected to a battery mounted on the vehicle body, and is also electrically connected to an electrical component (a speaker, a power window, or the like) provided on the slide door, and supplies electric power from the battery to the electrical component. The electric wire 5 is formed to be longer than the corrugated tube 6, and both ends of the electric wire 5 are drawn out from the corrugated tube 6 and exposed.

The corrugated tube 6 is formed in a tubular shape, and the electric wire 5 is disposed inside the tube. As long as the corrugated tube 6 has a tubular shape, the corrugated tube 6 particularly in a cross-sectional view may be formed in a circular shape, may be formed in an elliptical shape, an oval shape, or the like, or may be formed in a polygonal shape. In addition, the corrugated tube 6 may or may not include a notch extending in a longitudinal direction for inserting the electric wire 5. The corrugated tube 6 of the present embodiment is made of a synthetic resin, is provided in a bellows shape in which concave grooves and ridges are alternately provided, and has flexibility.

Figure 2:
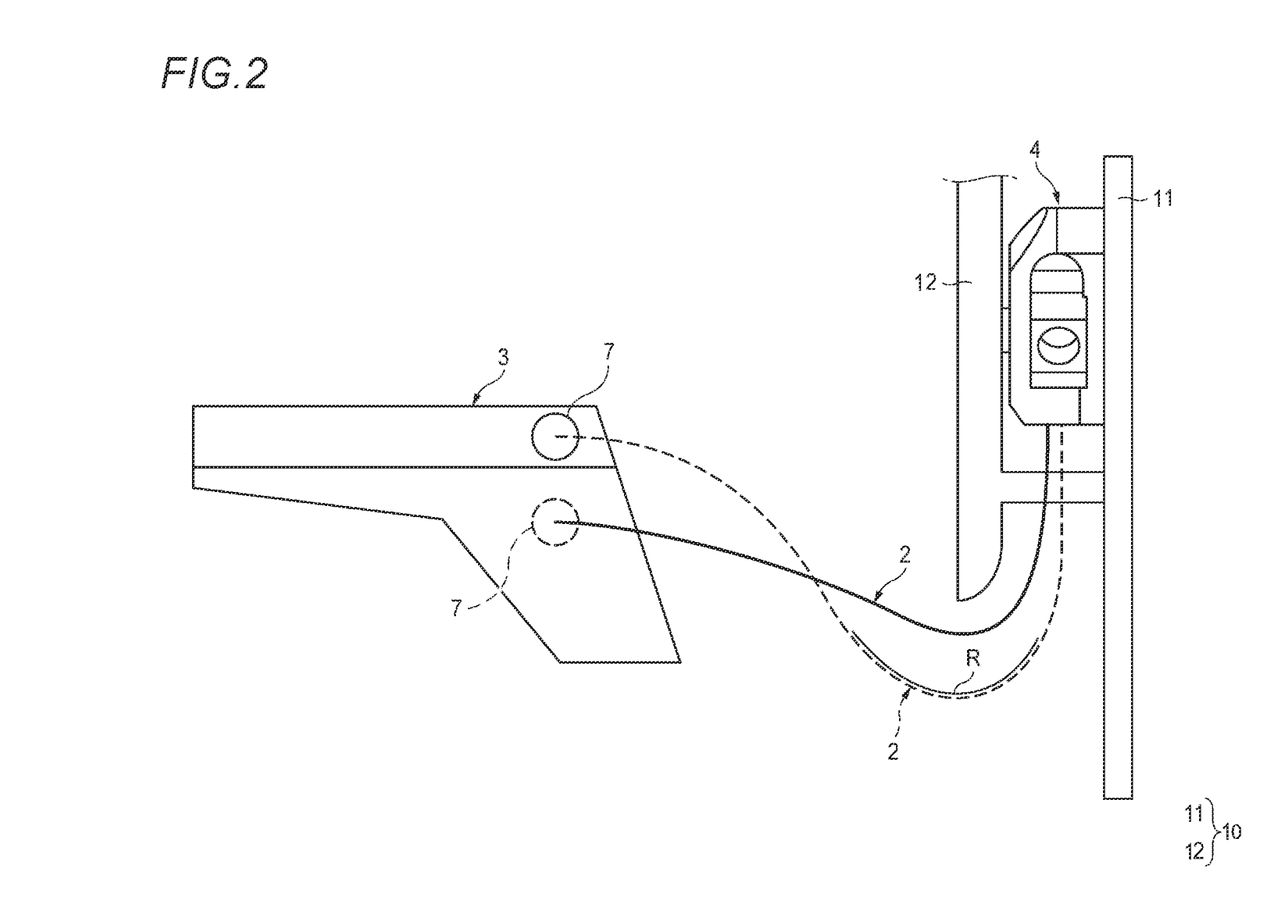
FIG. 2 is a side view of the wiring structure of a corrugated tube shown in FIG. 1.

The body side unit 3 attaches one end portion of the wire harness 2 to the vehicle body so as to be rotatable in a circumferential direction of the wire harness 2. The door side unit 4 attaches the other end portion of the wire harness 2 to the slide door 10 so as to be rotatable about an axis along a width direction. More specifically, as shown in FIG. 2, the slide door 10 includes an outer panel (not shown) and an inner panel 11 made of metal, and a door trim 12 made of resin. The inner panel 11 is disposed on an indoor side of the outer panel. The door trim 12 is disposed on a vehicle cabin side of the inner panel 11.

The door side unit 4 above is disposed between the inner panel 11 and the door trim 12. The body side unit 3 is disposed, for example, on a floor portion below the door side unit 4 in an up-down direction. The wire harness 2 drawn out from the door side unit 4 is attached to the body side unit 3 through a lower end of the door trim 12.

Figure 3:
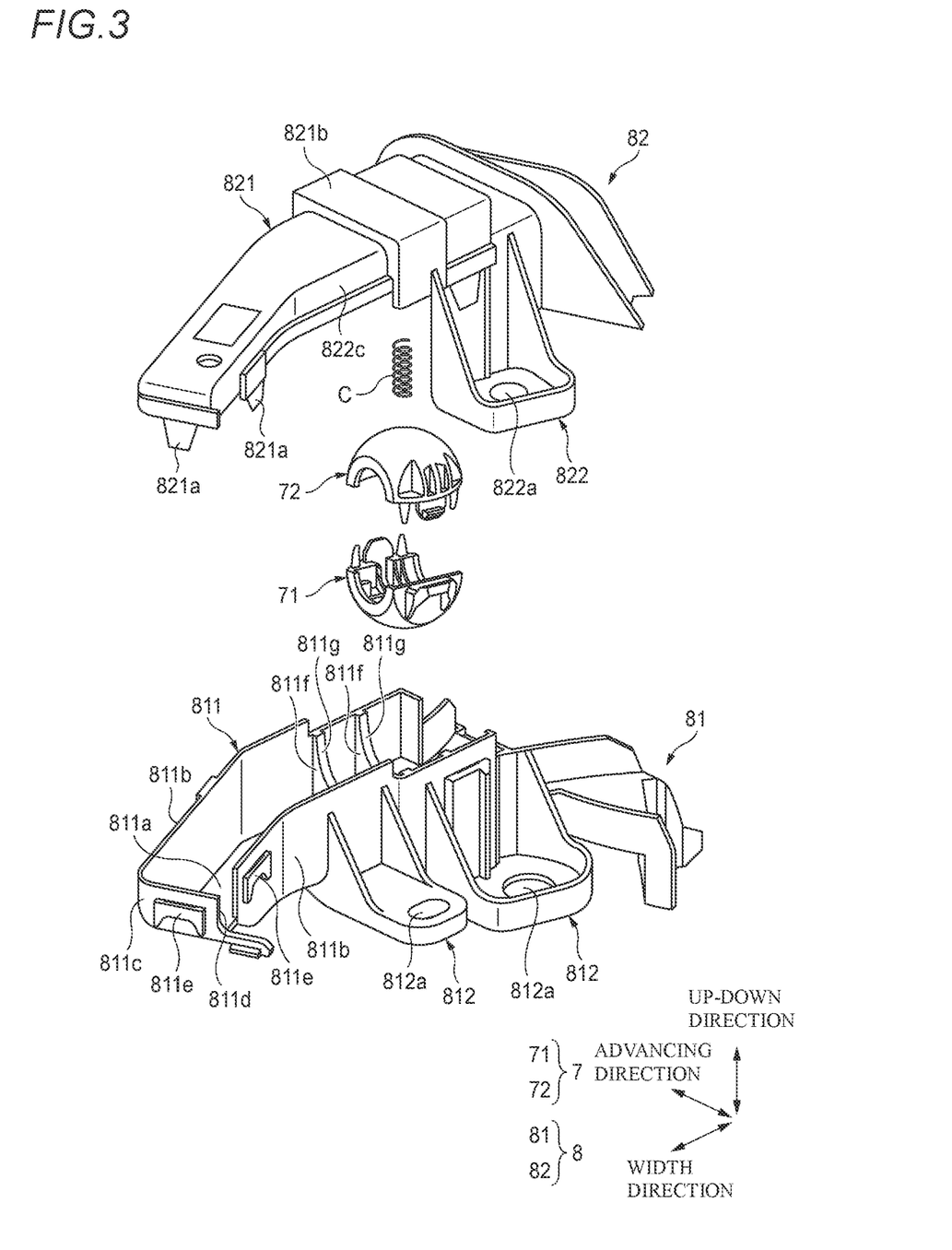
FIG. 3 is an exploded perspective view of a body side unit shown in FIG. 1.

Next, the body side unit 3 above will be described in detail. As shown in FIG. 3, the body side unit 3 includes a rotary inner (body side attachment portion) 7 attached to the wire harness 2, a body side protector 8 (body side fixing portion) rotatably supporting the rotary inner 7 and fixed to the vehicle body, and a coil spring C (biasing member).

Figure 4:
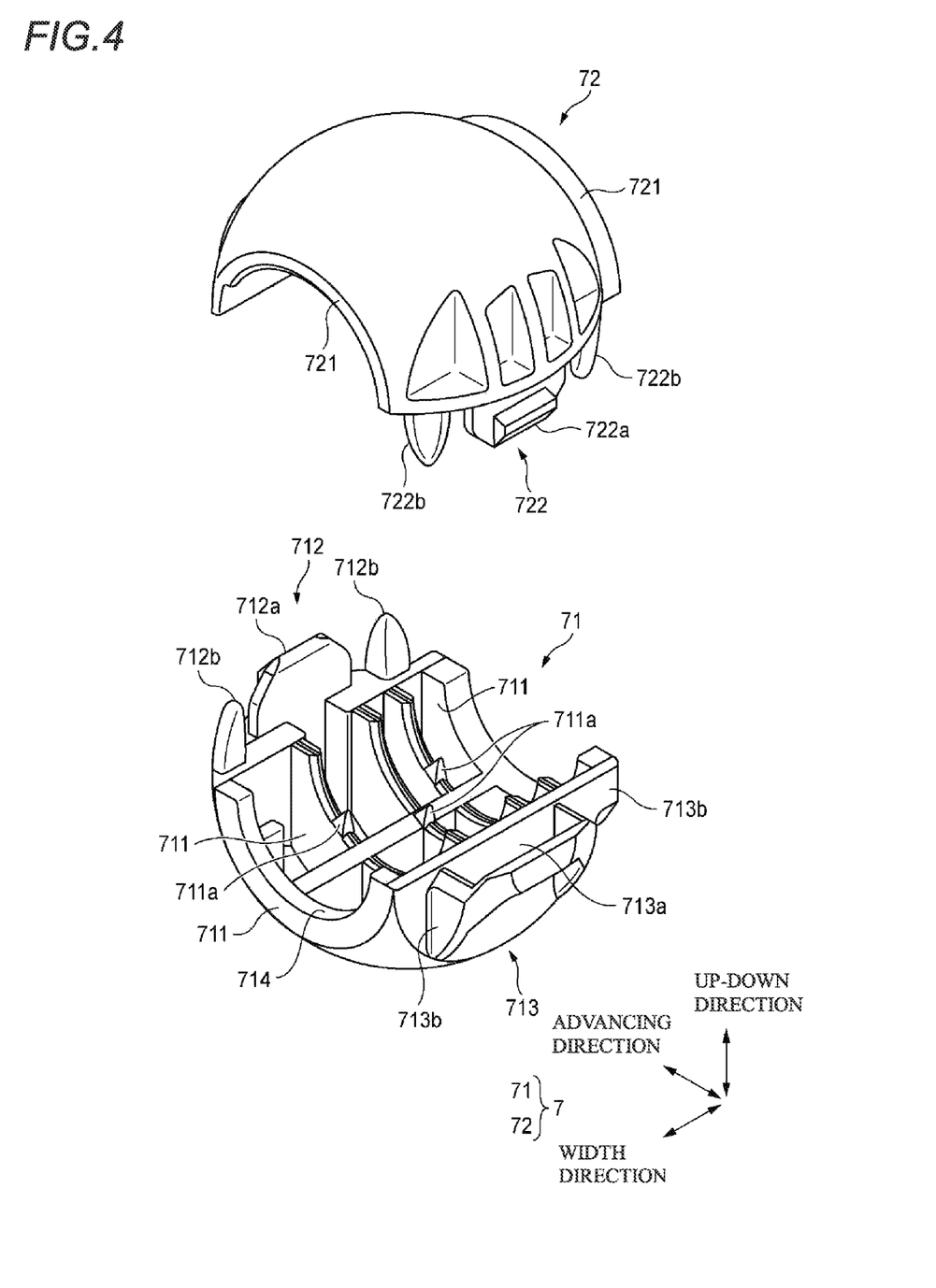
FIG. 4 is an enlarged view of a rotary inner shown in FIG. 3.

The rotary inner 7 has a spherical outer shape. As shown in FIG. 4, the rotary inner 7 includes a lower housing 71 and an upper housing 72 which are attached to the wire harness 2 so as to sandwich both sides of the wire harness 2 in the up-down direction (radial direction). The lower housing 71 and the upper housing 72 have a common structure except for a part of a structure. Here, first, a structure of the lower housing 71 will be described in detail.

The lower housing 71 is formed in a hollow hemispherical shape as a whole. The lower housing 71 is provided with notches at one end and the other end in the width direction cut out by two parallel planes. The lower housing 71 having such a shape includes a plurality of ribs 711, a locking protrusion 712, and a locking recess 713.

The plurality of ribs 711 are provided along edge portions of the notches provided at the one end and the other end. The plurality of ribs 711 are also provided side by side in the width direction between one end and the other end of the lower housing 71. The rib 711 is provided with a semicircular notch 714 at an upper end, and a radius of the semicircle is the same as or slightly smaller than a radius of the corrugated tube 6. When the rotary inner 7 is attached to the wire harness 2, the rib 711 comes into contact with an outer surface of the corrugated tube 6. At this time, because the rib 711 has a radius substantially the same as or slightly smaller than the radius of the corrugated tube 6, the rib 711 presses the corrugated tube 6 when the lower housing 71 and the upper housing 72 are assembled to each other. As a result, the wire harness 2 is fixed (supported) to the rotary inner 7.

The locking protrusion 712 includes a locking protrusion piece 712a protruding from an upper end surface of the lower housing 71, and two guide protrusion pieces 712b provided in the width direction of the locking protrusion piece 712a so as to sandwich the locking protrusion piece 712a and protruding from the upper end surface of the lower housing 71. The locking recess 713 includes a locking hole 713a bored from the upper end surface of the lower housing 71, and guide holes 713b provided in the width direction of the locking hole 713a and bored from the upper end surface of the lower housing 71. The locking protrusion 712 and the locking recess 713 are located at positions separated from each other, and the locking protrusion 712 is located on one side in an advancing direction (direction orthogonal to the width direction) and the locking recess 713 is located on the other side.

The upper housing 72 also has similar shape as the locking protrusion piece 712a and the guide protrusion pieces 712b of the locking protrusion 712, and the locking hole 713a and the guide holes 713b of the locking recess 713 (a locking hole and guide holes corresponding to a locking protrusion piece 722a and guide protrusion pieces 722b of a locking protrusion 722 are not shown). When the lower housing 71 and the upper housing 72 are assembled to each other, the locking protrusion pieces 712a, 722a guided by the guide protrusion pieces 712b, 722b and the guide holes 713b are guided into the locking hole 713a, the locking protrusion pieces 712a, 722a and the locking hole 713a are engaged with each other, and the guide protrusion pieces 712b, 722b and the guide holes 713b fit into each other.

In addition, a protrusion 711a is provided at the upper end of the rib 711, and the protrusion 711a enters the outer surface of the corrugated tube 6, so that a stronger pressing force can be applied to the corrugated tube 6. As a result, the corrugated tube 6 is more firmly fixed to the rotary inner 7.

Next, a structure of the upper housing 72 will be described in detail. The upper housing 72 is formed in a hollow hemispherical shape as a whole. The upper housing 72 is provided with notches at one end and the other end cut out by two parallel planes. The upper housing 72 having such a shape includes a plurality of ribs 721, a locking protrusion 722, and a locking recess (not shown).

The ribs 721, the locking protrusion 722, and the locking recess (not shown) of the upper housing 72 are similar as those in which "upper" is replaced with "lower" in a description of the locking protrusion 712 and the locking recess 713 of the lower housing 71 above, so that a detailed description is omitted here.

As shown in FIG. 3, the protector 8 includes a base portion 81 that is fixed to the vehicle body, and a lid portion 82 that is assembled to the base portion 81. The base portion 81 includes a guide portion 811 and fixing pieces 812 for fixing the base portion 81 to the vehicle body protruding from one side of the guide portion 811 in the advancing direction.

The guide portion 811 includes a bottom surface portion 811a which is long in the width direction, a pair of upright wall portions 811b erected from end portions on both sides of the bottom surface portion 811a in the advancing direction, and an upright wall portion 811c erected from an end portion on a side of the bottom surface portion 811a away from the slide door, and is opened toward an upper side and a slide door side. The wire harness 2 is inserted into the guide portion 811 from an opening on the slide door side. One of a pair of upright wall portions 811c is provided with a notch 811d. The electric wire 5 inserted into the corrugated tube 6 is drawn out of the guide portion 811 from the notch 811d. In addition, the upright wall portions 811b and 811c are provided with locking recesses 811e to be locked to the lid portion 82.

In addition, a pair of ribs 811f, 811f are erected from the bottom surface portion 811a above. The pair of ribs 811f, 811f are provided side by side in the width direction, and an interval between the ribs 811f, 811f is smaller than a diameter of the spherical rotary inner 7. In addition, semicircular notches 811g are provided on upper faces of the pair of ribs 811f, 811f. A radius of the notch 811g is smaller than the diameter of the rotary inner 7. By mounting the rotary inner 7 on the pair of ribs 811f, 811f, the rotary inner 7 is rotatably supported in the circumferential direction of the wire harness 2.

The fixing piece 812 protrudes from one of the pair of upright wall portions 811b in the advancing direction, and a fixing hole 812a into which a fixing member such as a bolt is inserted is formed in the fixing piece 812. In the present embodiment, two fixing pieces 812 are provided side by side in the width direction.

The lid portion 82 includes a lid portion body 821 that covers an upper opening of the base portion 81, and a fixing piece 822 that protrudes from the lid portion body 821. The lid portion body 821 has an upper face portion 821b which is long in the width direction and an upright wall portion 822c erected from a peripheral edge of the upper face portion 821b toward the guide portion 811, and is opened downward. The upright wall portion 822c above is provided with locking protrusions 821a that are inserted into and locked to the locking recesses 811e of the base portion 81. The fixing piece 822 protrudes toward the base portion 81, and a fixing hole 822a into which a fixing member such as a bolt is inserted is formed in the fixing piece 822. The fixing pieces 812 and 822 are overlapped with each other when the base portion 81 and the lid portion 82 are assembled, and are fixed to the vehicle body by inserting a bolt.

Figure 5:
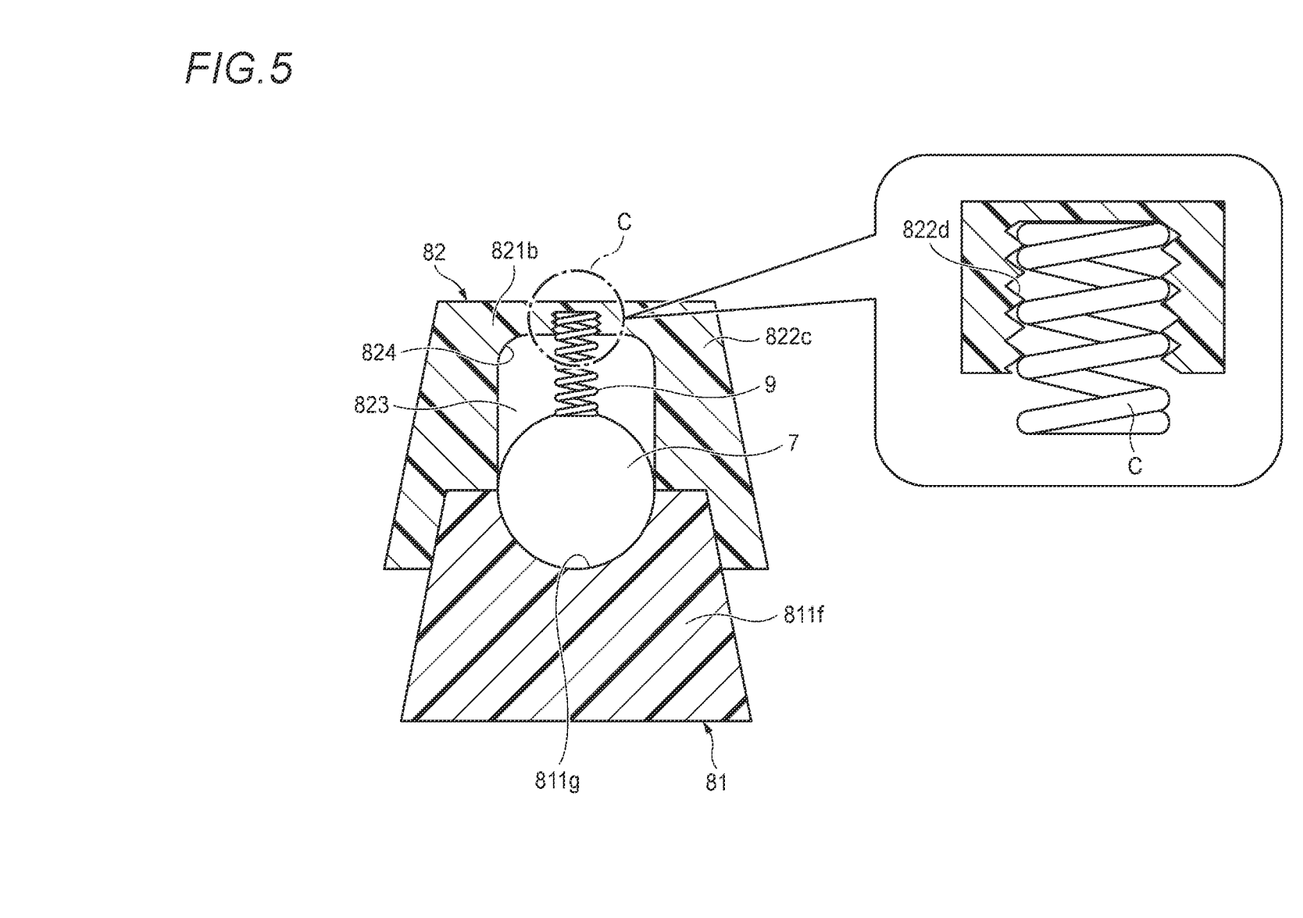
FIG. 5 is a schematic cross-sectional view of the body side unit shown in FIG. 3.

As shown in FIG. 5, a pair of ribs 823, 823 for rotatably supporting the rotary inner 7 in the radial direction are also erected from the upper face portion 821b on the lid portion body 821. The pair of ribs 823, 823 are provided side by side in the width direction, and have the same interval as the pair of ribs 811f, 811f, and face the pair of ribs 811f, 811f in the up-down direction. In addition, a substantially rectangular notch 824 is provided on lower faces of the pair of ribs 823, 823. The notch 824 is long in the up-down direction, and a length of a short side thereof is substantially the same as a diameter of the notch 811g. The rotary inner 7 is positioned between the rib 811f and the rib 823.

The coil spring C is provided between the upper face portion 821b of the lid portion 82 above and the upper housing 72 of the rotary inner 7, and biases the rotary inner 7 downward in the up-down direction. The coil spring C is disposed such that an axial direction thereof is along the up-down direction. An upper end of the coil spring C is screwed into a groove portion 822d provided in the upper face portion 821b, and the coil spring C is fixed to the lid portion 82. A lower end of the coil spring C is in sliding contact with (in contact with) a spherical surface of the rotary inner 7. According to the above configuration, the rotary inner 7 is supported so as to be movable in the up-down direction.

Figure 6:
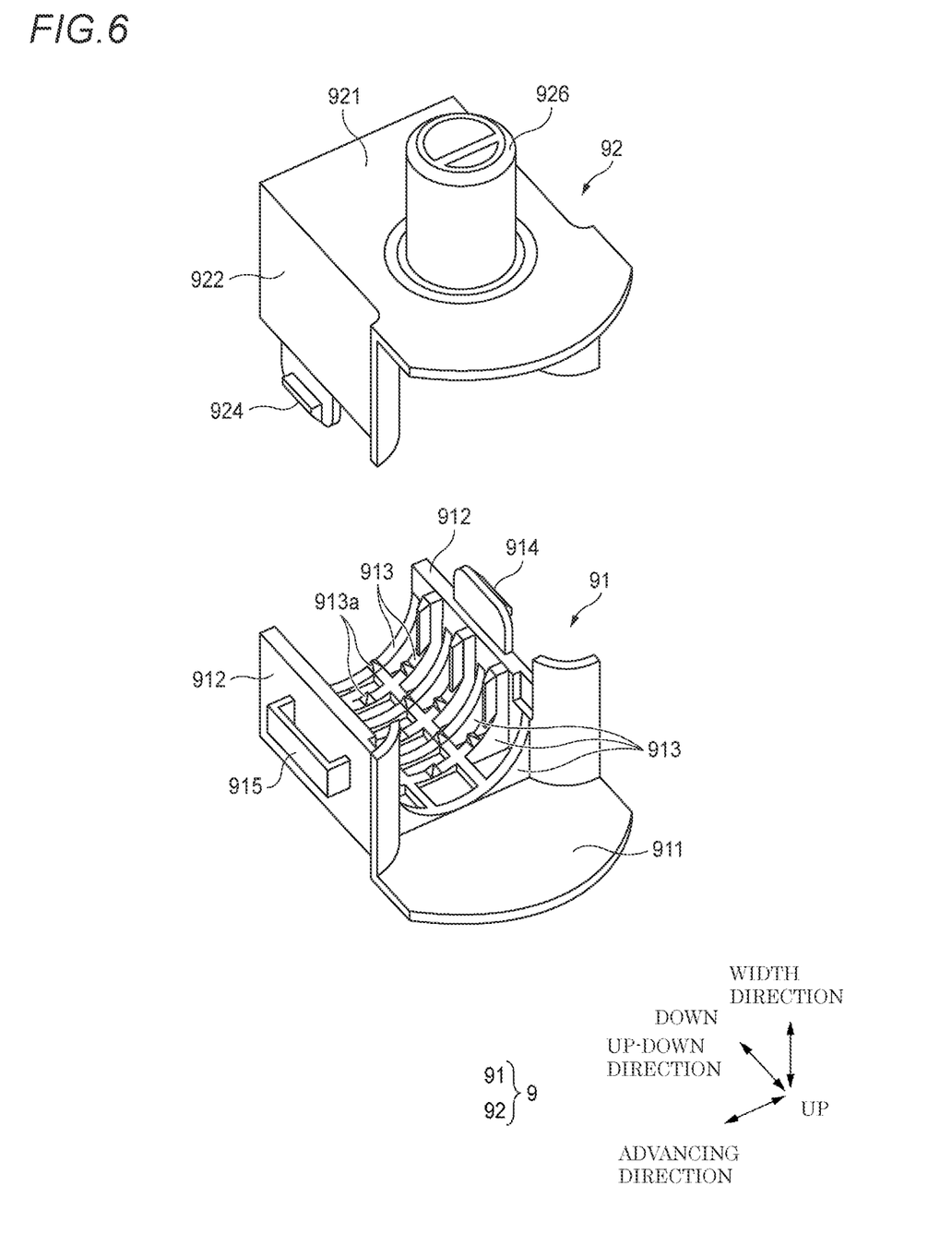
FIG. 6 is an exploded perspective view of the rotary inner forming a door side unit shown in FIG. 1.
Figure 7:
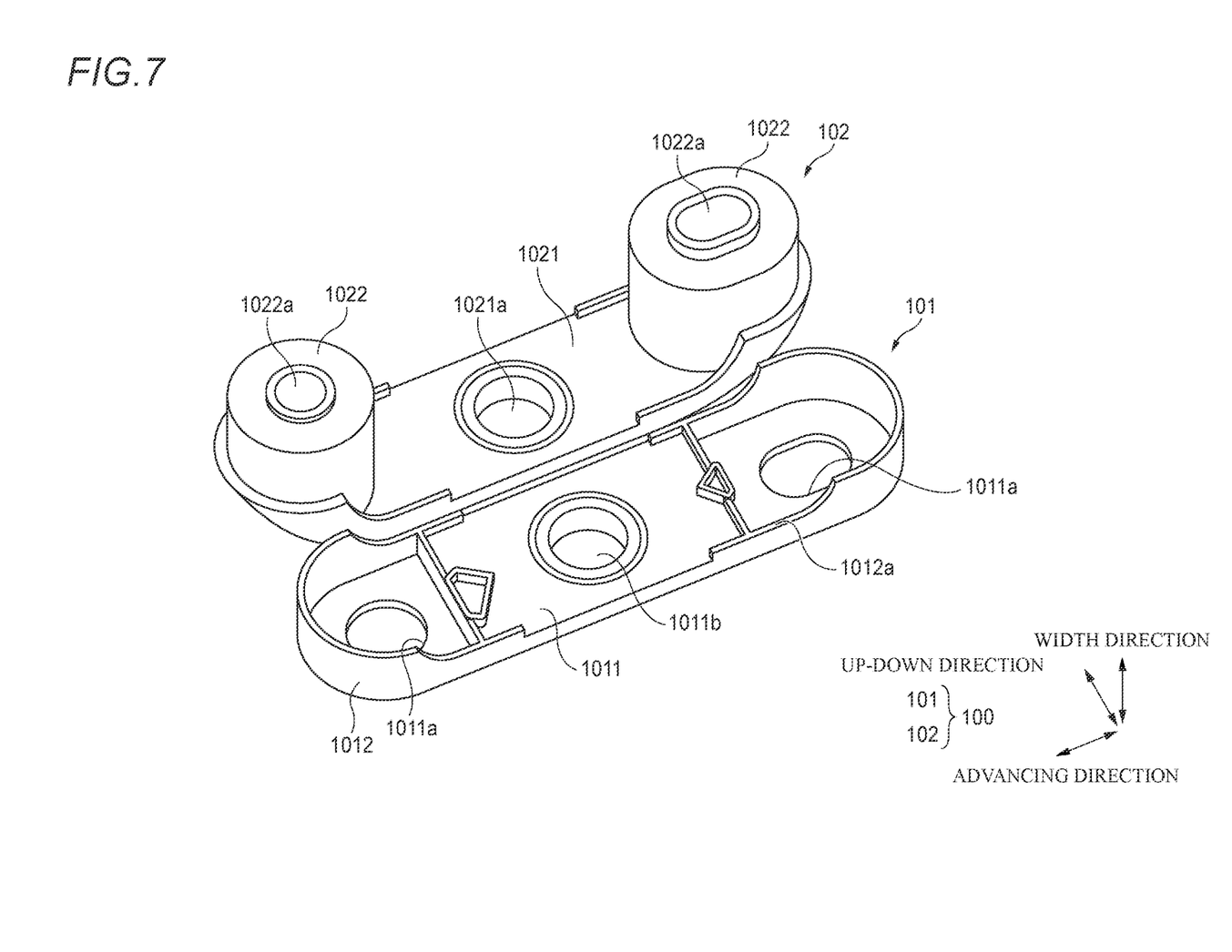
FIG. 7 is an exploded perspective view of a protector forming the door side unit shown in FIG. 1.

As shown in FIGS. 6 and 7, the door side unit 4 includes a rotary inner 9 attached to the other end portion of the wire harness 2, and a protector 100 rotatably supporting the rotary inner 9 about an axis and fixed to the slide door.

As shown in FIG. 6, the rotary inner 9 includes a first housing 91 and a second housing 92 which are attached to the corrugated tube 6 so as to sandwich both sides of the corrugate tube 6 in the width direction. The first housing 91 and the second housing 92 have a common structure except for a part thereof. Here, first, a structure of the first housing 91 will be described in detail. The first housing 91 includes a bottom surface portion 911, a pair of upright wall portions 912, a plurality of ribs 913, a locking protrusion 914, a locking recess 915, and a protrusion column (not shown).

The bottom surface portion 911 is long in the up-down direction. The pair of upright wall portions 912 are erected from end portions on both sides of the bottom surface portion 911 in the advancing direction. The pair of upright wall portions 912 are provided halfway from a lower end to an upper end of the bottom surface portion 911. That is, the pair of upright wall portions 912 are not provided at the upper end of the bottom surface portion 911. The plurality of ribs 913 extend along the advancing direction and are arranged side by side in the up-down direction. The rib 913 has a semicircular upper end, and a radius of the semicircle is the same as or slightly smaller than a radius of a ridge C of a bellows portion 61 in the corrugated tube 6. When the rotary inner 9 is attached to the corrugated tube 6, the rib 913 comes into contact with the outer surface of the corrugated tube 6. At this time, because the rib 913 has a radius substantially the same as or slightly smaller than the radius of the corrugated tube 6, the rib 913 presses the corrugated tube 6 when the first housing 91 and the second housing 92 are assembled to each other. As a result, the corrugated tube 6 is fixed (supported) to the rotary inner 9.

The locking protrusion 914 protrudes from one of the pair of upright wall portions 912 toward the second housing 92. The locking recess 915 is provided on the other of the pair of upright wall portions 912. The second housing 92 also has similar shape as the locking protrusion 914 and the locking recess 915 (corresponding to a locking protrusion 924; a locking recess is not shown). When the first housing 91 and the second housing 92 are assembled, the locking protrusions 914, 924 and the locking recess 915 are engaged with each other.

In addition, a protrusion 913a is provided at the upper end of the rib 913 above, and the protrusion 913a enters a concave groove R of the bellows portion 61, so that a stronger pressing force can be applied to the corrugated tube 6. As a result, the corrugated tube 6 is more firmly fixed to the rotary inner 9.

The protrusion column (not shown) protrudes in a columnar shape from the bottom surface portion 911 to a side opposite to the upright wall portion 912.

Next, a structure of the second housing 92 will be described in detail. The second housing 92 includes a bottom surface portion 921, an upright wall portion 922, a plurality of ribs (not shown), a locking protrusion 924, a locking recess (not shown), and a protrusion column 926. The bottom surface portion 921, the upright wall portion 922, the plurality of ribs (not shown), the locking protrusion 924, the locking recess (not shown), and the protrusion column 926 of the second housing 92 are similar as the bottom surface portion 911, the upright wall portion 912, the plurality of ribs 913, the locking protrusion 914, the locking recess 915, and the protrusion column (not shown) of the first housing 91 described above, so that a detailed description is omitted here.

The rotary inner 9 above is supported by the protector 100 so as to be rotatable about an axis, with the protrusion column (not shown) of the first housing 91 and the protrusion column 926 of the second housing 92 serving as a rotation axis.

The protector 100 includes a third housing 101 provided on the slide door side, and a fourth housing 102 overlapped on the third housing 101. The third housing 101 includes a bottom surface portion 1011 which is long in the advancing direction and a peripheral wall portion 1012 erected from a peripheral edge of the bottom surface portion 1011, and is opened toward a side away from the slide door in the width direction. The bottom surface portion 1011 is overlapped with the slide door. The bottom surface portion 1011 is provided with a pair of fixing holes 1011a and a shaft support hole 1011b. The pair of fixing holes 1011a are provided to penetrate both sides of the bottom surface portion 1011 in the advancing direction, and a fixing member such as a boss is passed through the pair of fixing holes 1011a. The shaft support hole 1011b is provided by recessing substantially a center of the bottom surface portion 1011 in the advancing direction, and a protrusion column (not shown) of the first housing 91 is inserted into the shaft support hole 1011b. In addition, notches 1012a are provided in portions of the peripheral wall portion 1012 facing each other in the up-down direction. Both ends of the rotary inner 9 in the up-down direction protrude from the notches 1012a.

The fourth housing 102 includes a bottom surface portion 1021 which is long in the advancing direction and hollow columnar portions 1022 erected from both sides of the bottom surface portion 1021 in the advancing direction toward the third housing 101. A shaft support hole 1021a is provided in the bottom surface portion 1021. The shaft support hole 1021a is provided by recessing substantially a center of the bottom surface portion 1021 in the advancing direction, and the protrusion column 926 of the second housing 92 is inserted into the shaft support hole 1021a. A bottom surface of the columnar portion 1022 is overlapped with the fixing hole 1011a of the third housing 101, and is provided with a fixing hole 1022a through which a fixing member such as a boss is passed.

Figure 8A:
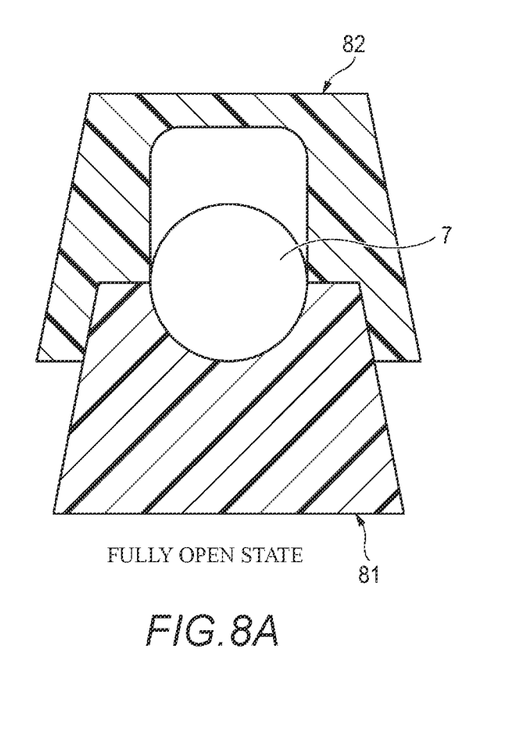
FIG. 8A is a schematic cross-sectional view of a vehicle side unit when a slide door is in a fully closed state and in a fully open state.
Figure 8B:
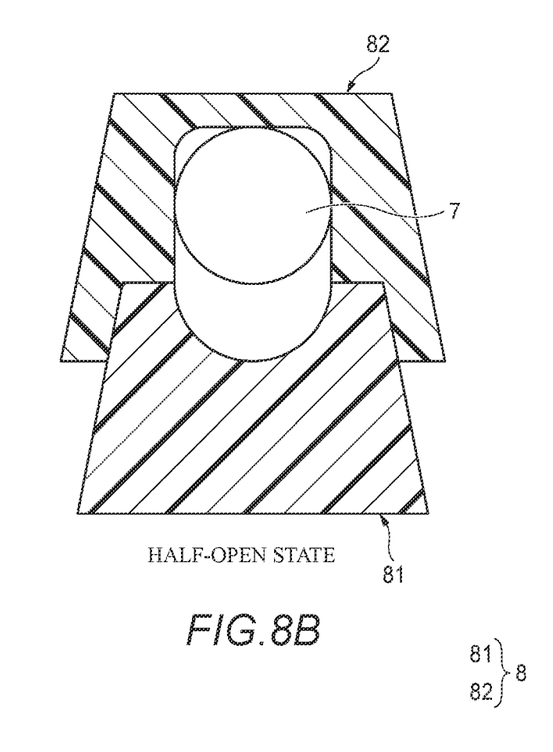
FIG. 8B is a schematic cross-sectional view of the vehicle side unit when the slide door is in a half-open state.

Next, in the above wiring structure of a wire harness 1, operations of the body side unit 3 when the slide door 10 is in the fully open state to the fully closed state will be described with reference to FIGS. 1, 2, 8, and the like.

As shown in FIG. 1, when the slide door 10 is in the fully open state or in the fully closed state, a distance between the body side unit 3 and the door side unit 4 is long, and the wire harness 2 is stretched. At this time, since the wire harness 2 does not push up the rotary inner 7, the rotary inner 7 is located below the protector 8 by a biasing force of the coil spring C (FIG. 8A). Accordingly, as shown in FIG. 2, the wire harness 2 can be prevented from interfering with the lower end of the door trim 12.

On the other hand, as shown in FIG. 1, when the slide door 10 is in the half-open state, the distance between the body side unit 3 and the door side unit 4 is shortened, and the wire harness 2 is loosened. At this time, as shown in FIG. 2, a central portion of the wire harness 2 loosens downward in the up-down direction. Since the wire harness 2 pushes up the rotary inner 7 due to the loosen, the rotary inner 7 is located above the protector 8 against the biasing force of the coil spring C (FIG. 8B). As a result, a bending R (FIG. 2) of the central portion of the wire harness 2 increases, a force with which the wire harness 2 pushes up the rotary inner 7 becomes small, interference between the wire harness 2 and the body side unit 3 can be prevented, and abnormal sound can be prevented.

According to the above embodiment, the coil spring (biasing member) C can be easily fixed to the protector 8 by providing the groove portion 822d in which the coil spring C is screwed in the protector 8.

According to the above embodiment, the outer shape of the rotary inner 7 is a sphere, and a tip end of the coil spring C is in contact with a surface of the sphere. Accordingly, the coil spring C can bias the rotary inner 7 without interfering with a rotation of the rotary inner 7.

The present invention is not limited to the above embodiment, and modifications, improvements, and the like can be made as appropriate. In addition, a material, shape, size, number, arrangement position, and the like of each component in the above embodiment are optional and are not limited as long as the present invention can be achieved.

According to the above embodiment, the coil spring C is used as the biasing member, but the present invention is not limited thereto. A plate spring may be used as the biasing member.

According to the above embodiment, the coil spring C is screwed into the groove portion 822d provided in the protector 8 to fix the coil spring C to the protector 8, but the present invention is not limited thereto. The coil spring C and the protector 8 may be integrally molded by insert molding to fix the coil spring C to the protector 8.

In the present embodiment, according to the body side unit and the wiring structure of a wire harness, when the wire harness is in a loosened state, the central portion of the wire harness is bent downward in the up-down direction. Accordingly, the wire harness pushes the body side attachment portion upward in the up-down direction against the biasing member, the bending R of the central portion of the wire harness increases, and the interference between the wire harness and the body side unit can be prevented. When the wire harness is in a stretched state, the biasing member pushes the body side attachment portion downward in the up-down direction, so that interference between the wire harness and the door trim can be prevented.

In the present embodiment, the coil spring (biasing member) can be easily fixed to the body side fixing portion by providing the groove portion in which the coil spring is screwed in the body side fixing portion.

According to the present embodiment, the coil spring is in contact with the sphere of the body side attachment portion. Accordingly, the coil spring can bias the body side attachment portion without interfering with a rotation of the body side attachment portion.

In addition, according to the present embodiment, it is possible to prevent interference of the wire harness.

What is claimed is:

1. A body side unit configured to attach a wire harness wired between a vehicle body and a slide door to the vehicle body, the body side unit comprising:
   a body side attachment portion that is attached to the wire harness;
   a body side fixing portion that supports the body side attachment portion rotatably and movably in an up-down direction, and that is fixed to the vehicle body; and
   a biasing member that is provided between the body side attachment portion and the body side fixing portion, and that biases the body side attachment portion such that the body side attachment portion faces downward in the up-down direction, wherein
the biasing member is in sliding contact with the body side attachment portion.

2. The body side unit according to claim 1, wherein
the biasing member is formed of a coil spring, and
the body side fixing portion is provided with a groove portion into which the coil spring is screwed.

3. The body side unit according to claim 1, wherein
the biasing member is formed of a coil spring,
an outer shape of the body side attachment portion is a sphere, and
a tip end of the coil spring is in contact with a surface of the sphere.

4. The body suit unit according to claim 1, further comprising:
a plurality of ribs formed in the body side attachment portion, wherein
each of the plurality of ribs includes a protrusion extending from an upper end of the each of the plurality of ribs.

5. A wiring structure comprising:
a wire harness;
a body side unit that is configured to attach the wire harness to a vehicle body; and
a door side unit that is configured to attach the wire harness to a slide door,
wherein the body side unit includes:
a body side attachment portion to be attached to the wire harness;
a body side fixing portion rotatably supporting the body side attachment portion and fixed to the vehicle body; and
a biasing member provided between the body side attachment portion and the body side fixing portion and configured to bias the body side attachment portion such that the body side attachment portion faces downward in an up-down direction, wherein the biasing member is in sliding contact with the body side attachment portion.

* * * * *